US012396921B2

(12) United States Patent
Cranford

(10) Patent No.: US 12,396,921 B2
(45) Date of Patent: Aug. 26, 2025

(54) HUMAN STEPPING POWERED MECHANICAL CARDIO-PULMONARY RESUSCITATION COMPRESSION AID

(71) Applicant: Joshua Cranford, Edgewater, MD (US)

(72) Inventor: Joshua Cranford, Edgewater, MD (US)

( * ) Notice: Subject to any disclaimer, the term of this patent is extended or adjusted under 35 U.S.C. 154(b) by 762 days.

(21) Appl. No.: 17/826,534

(22) Filed: May 27, 2022

(65) Prior Publication Data

US 2022/0378653 A1 Dec. 1, 2022

Related U.S. Application Data

(60) Provisional application No. 63/193,957, filed on May 27, 2021.

(51) Int. Cl.
*A61H 31/00* (2006.01)

(52) U.S. Cl.
CPC ......... *A61H 31/007* (2013.01); *A61H 31/008* (2013.01); *A61H 2031/003* (2013.01)

(58) Field of Classification Search
CPC .... A61H 31/00; A61H 31/006; A61H 31/007; A61H 31/008; A61H 2201/14; A61H 2201/1246; A61H 2201/1253; F03G 5/063; F03G 5/064; B05C 17/015; E02F 9/2292; E02F 9/2285; B66F 3/42; F15B 17/00; F15B 7/00; F04B 9/14; F04B 31/00; F04B 33/00
See application file for complete search history.

(56) References Cited

U.S. PATENT DOCUMENTS

| | | | | | |
|---|---|---|---|---|---|
| 4,976,372 | A * | 12/1990 | Rogers, Jr. | B05C 17/015 | 222/324 |
| 5,251,445 | A * | 10/1993 | Farell | B66F 3/42 | 60/474 |
| 8,535,251 | B1 * | 9/2013 | Rao | A61H 31/007 | 601/41 |
| 2001/0050359 | A1 * | 12/2001 | Tominaga | B66F 3/24 | 254/8 B |
| 2002/0056738 | A1 * | 5/2002 | Baird | B28D 1/222 | 225/103 |
| 2006/0127254 | A1 * | 6/2006 | Bakker | F04B 49/24 | 417/440 |
| 2008/0146975 | A1 * | 6/2008 | Ho | A61H 31/006 | 601/44 |

(Continued)

*Primary Examiner* — Justine R Yu
*Assistant Examiner* — Christopher E Miller
(74) *Attorney, Agent, or Firm* — The Rapacke Law Group, P.A.; Andrew S. Rapacke

(57) ABSTRACT

A compression device may include a compression plunger in operable communication with a fulcrum assembly and housing assembly in operable communication with a stepper assembly. The compression device may be constructed and arranged to allow a user to administer CPR to a patient by stepping on a portion of the stepper assembly to generate hydraulic power that may be utilized to move the compressor plunger to apply compressive force to the patient's chest. The compression device may include a housing assembly and fulcrum assembly constructed and arranged to provide for variable height and width such that patients of varying sizes can be accommodated and may receive CPR.

19 Claims, 6 Drawing Sheets

(56) References Cited

U.S. PATENT DOCUMENTS

| | | | | |
|---|---|---|---|---|
| 2010/0034678 | A1 * | 2/2010 | Weber | F04B 9/14 417/437 |
| 2014/0100496 | A1 * | 4/2014 | Johnson | A61H 31/005 601/41 |
| 2025/0134764 | A1 * | 5/2025 | Doeve | A61H 31/007 |

* cited by examiner

HUMAN STEPPING POWERED MECHANICAL CARDIO-PULMONARY RESUSCITATION COMPRESSION AID

CROSS-REFERENCE TO RELATED APPLICATIONS

The present application claims priority to U.S. Provisional Patent Application No. 63/193,957 filed May 27, 2021, entitled "HUMAN STEPPING POWERED MECHANICAL CARDIO-PULMONARY RESUSCITATION COMPRESSION AID" which is hereby incorporated by reference in its entirety.

TECHNICAL FIELD

The embodiments generally relate to devices used to compress chest of an individual during cardiopulmonary resuscitation.

BACKGROUND

Cardiopulmonary resuscitation (CPR) is traditionally accomplished by use of a user's hands and the leveraging of their body weight to apply emergency chest compression to manually restore spontaneous circulation in an individual who may be in cardiac arrest. In some instances, CPR is performed over a period of time which may cause fatigue to those administering aid. It is recommended that those administering CPR exchange providing compressions every 1-2 minutes. However, this is not feasible when only a single rescuer is available. Devices that may assist in performing CPR rely on similar principles to that of traditional CPR and that the devices assist a user in using their hands to perform CPR or provide for electric Motors to perform compressions on an individual who may be in cardiac arrest.

SUMMARY

This summary is provided to introduce a variety of concepts in a simplified form that is further disclosed in the detailed description of the embodiments. This summary is not intended to identify key or essential inventive concepts of the claimed subject matter, nor is it intended for determining the scope of the claimed subject matter.

A compression device may include a human powered mechanical cardiopulmonary resuscitation compression aid. In use, an operator will apply stepping pressure to a stepper which will transfer the kinetic energy via a gear assembly to a stepper hydraulic motor. The stepper hydraulic motor creates pressure in a closed hydraulic system connected to the compressor hydraulic motor, which will convert the hydraulic pressure to vertical motion of a piston via a geneva mechanism and plenary gear which will drive the compressor lever effort end up. This will then drive work end down, driving the compressor head into the patient's chest to accomplish a CPR compression. The compression device uses user stepping motion to harness the power of the larger leg muscles to provide the force for compressions, rather than using an arm-driven device. The system does not require significant repositioning of the patient and does not require extensive training to use.

The compression device may be readily and efficiently maneuvered to a location having an individual in need of CPR. During use, the individual in need of CPR may be lying in a chest of prone position or may be moved into such a position such that the compression device may be moved into a suitable position over the individual. The suitable position may include the compressor plunger being positioned over the chest of the individual in need of CPR. The compressor plunger height may be adjusted by positioning the piston appropriately within the variable compression force recess.

According to one aspect of the compression device, the compression device may be constructed and arranged to relocate the exertion of a user from primarily the upper body to the lower body of the user. That is, the compression device may be constructed and arranged to utilize the strength of a user's lower body, including the legs, rather than use of the upper body and the leveraging of body weight to apply chest compressions.

According to one aspect of the compression device, the compression device may be constructed and arranged to allow a user to apply chest compressions to a recipient for prolonged periods of time with modest exertion of physical force.

According to one aspect of the compression device, the compression device may be constructed and arranged as a two-part assembly without the inclusion of an electric motor.

According to one aspect of the compression device, the compression device may be constructed and arranged such that use of the compression device does not require repositioning of an individual receiving chest compressions via the compression device and reduces the application of incomplete chest compressions.

Other illustrative variations within the scope of the invention will become apparent from the detailed description provided hereinafter. The detailed description and enumerated variations, while disclosing optional variations, are intended for purposes of illustration only and are not intended to limit the scope of the invention.

BRIEF DESCRIPTION OF THE DRAWINGS

A complete understanding of the present embodiments and the advantages and features thereof will be more readily understood by reference to the following detailed description when considered in conjunction with the accompanying drawings wherein.

DETAILED DESCRIPTION

Figure 1:
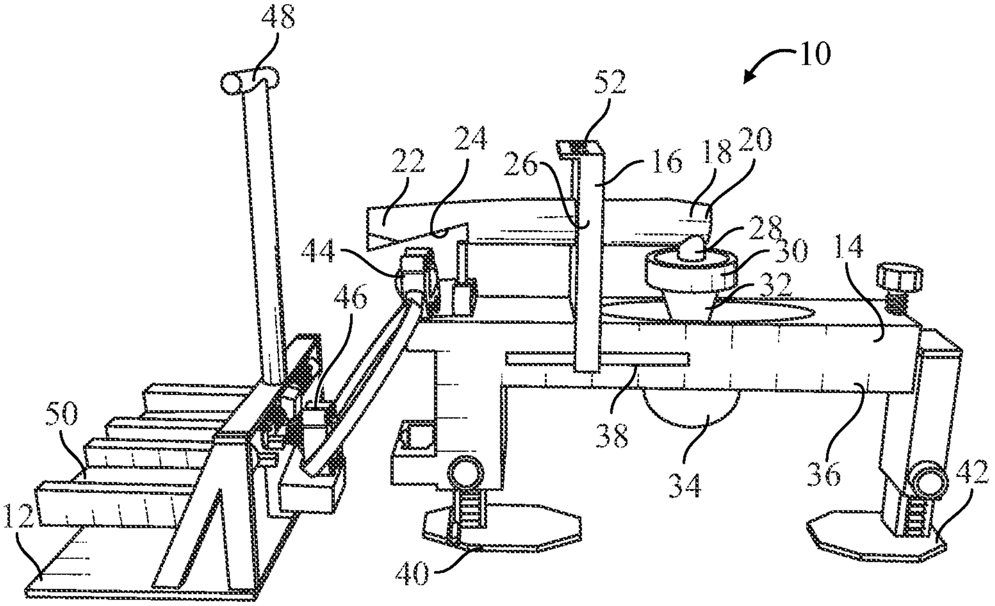
FIG. 1 illustrates a view of a compression device according to some variations described herein.

The specific details of the single embodiment or variety of embodiments described herein are to the described system and methods of use. Any specific details of the embodiments are used for demonstration purposes only and no unnecessary limitations or inferences are to be understood from there.

It is noted that the embodiments reside primarily in combinations of components and procedures related to the system. Accordingly, the system components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

An individual in need of CPR may be lying in a chest up prone position. A compression device including a housing assembly may be positioned above the individual in need of CPR, and a stepper assembly adjacent thereto. A user may adjust the position of the compressor plunger above the chest of the patient via a width slider assembly and at least one height adjustment foot. Compression plunger height may be adjusted by positioning a piston appropriately within a variable compression force recess of a compression drive lever. A user may step on the at least one stepper pedal in order to drive the compressor drive lever hydraulic motor, which in turn may drive a second motor attached to the piston which may apply force on the variable compression force recess of the compression drive lever which in turn may apply force on the compression plunger via a connection of the compression plunger and a connection end joint, thereby providing compressive force on the chest of a patient. Decompression device may include a variety of features constructed and arranged to improve efficiency of applying CPR to an individual. The compression device may feature variable compression depth based on a patient's chest width and chest height. The compression device may allow for variable lateral positioning across a patient's chest. The compression plunger may include a plunger stop constructed and arranged to prevent movement of the compression plunger too deep to avoid injury to a patient. The at least one height adjustment foot may include elastic members effective up to 62 pounds of pressure such that the compression device may move away from a patient if more than 62 pounds of force is being applied. The compression counter may provide a visual and audio cue to a user of the number of compressions performed on a patient, and a visual cue of how many times sets of 30 compressions have been administered.

The compression device uses user stepping motion to harness the power of the larger leg muscles to provide the force for compressions. This is advantageous when compared to using an arm-driven device or manual compressions which can be tiring for the individual attempting to provide compressions to the patient. The system does not require significant repositioning of the patient and does not require extensive training to use. In such, the system can be readily and efficiently applied when needed while allowing for continuous compressions to be applied over a period of time. The system may allow compression device users who would not normally have the strength and/or stamina to sufficiently apply compressions to provide aid to the patient.

According to one aspect of the compression device, the compression device may be constructed and arranged to relocate the exertion of a user from primarily the upper body to the lower body of the user. That is, the compression device may be constructed and arranged to utilize the strength of a user's lower body, including the legs, rather than use of the upper body and the leveraging of body weight to apply chest compressions.

Figure 5:
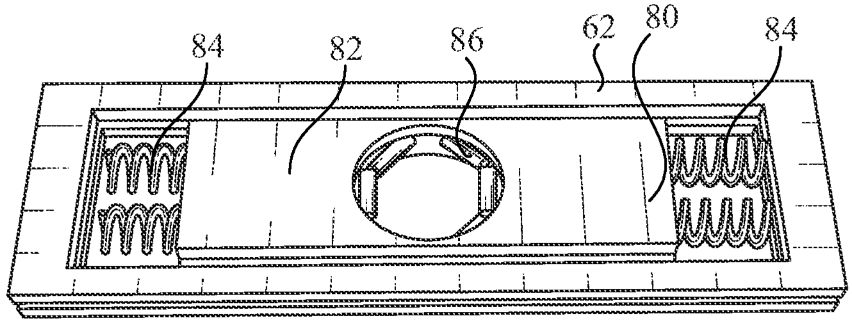
FIG. 5 illustrates a view of a portion compression device according to some variations described herein.
Figure 6:
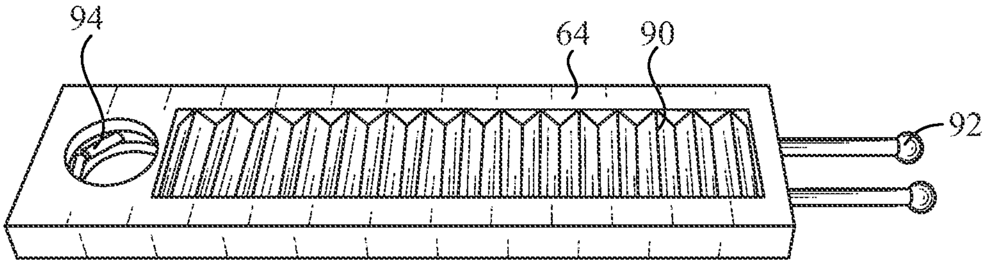
FIG. 6 illustrates a view of a portion compression device according to some variations described herein.
Figure 7:
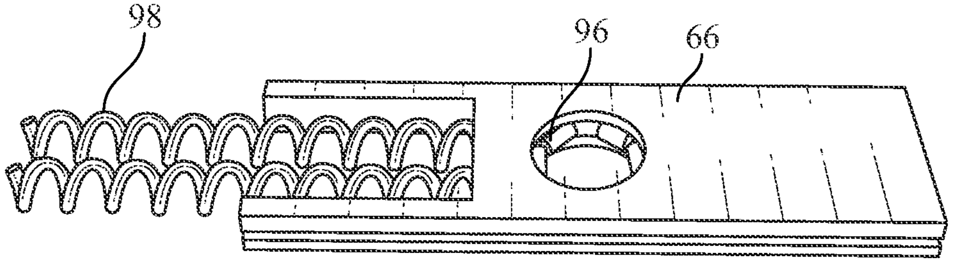
FIG. 7 illustrates a view of a portion compression device according to some variations described herein.
Figure 9:
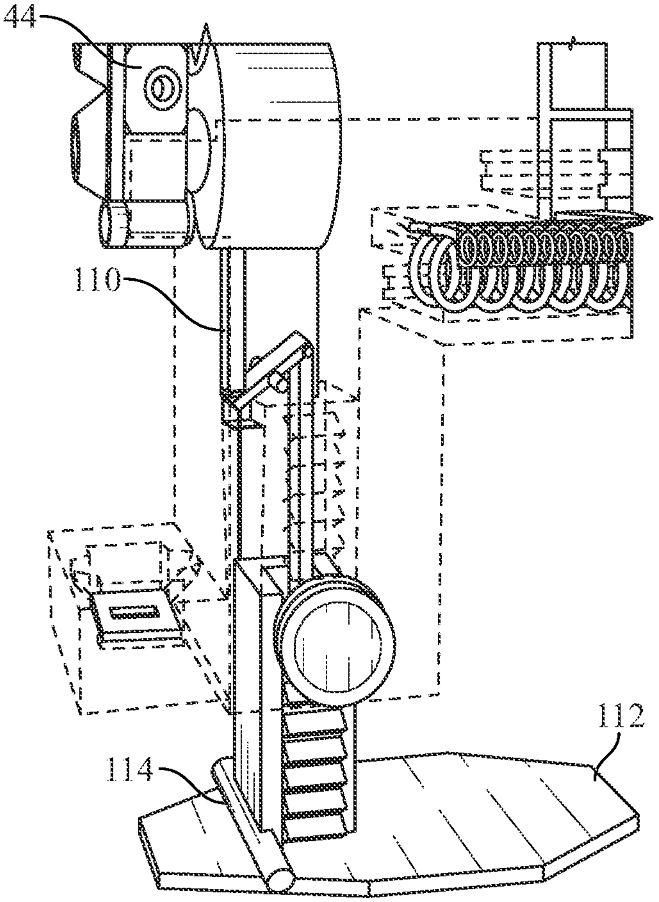
FIG. 9 illustrates a view of a portion compression device according to some variations described herein.
Figure 10:
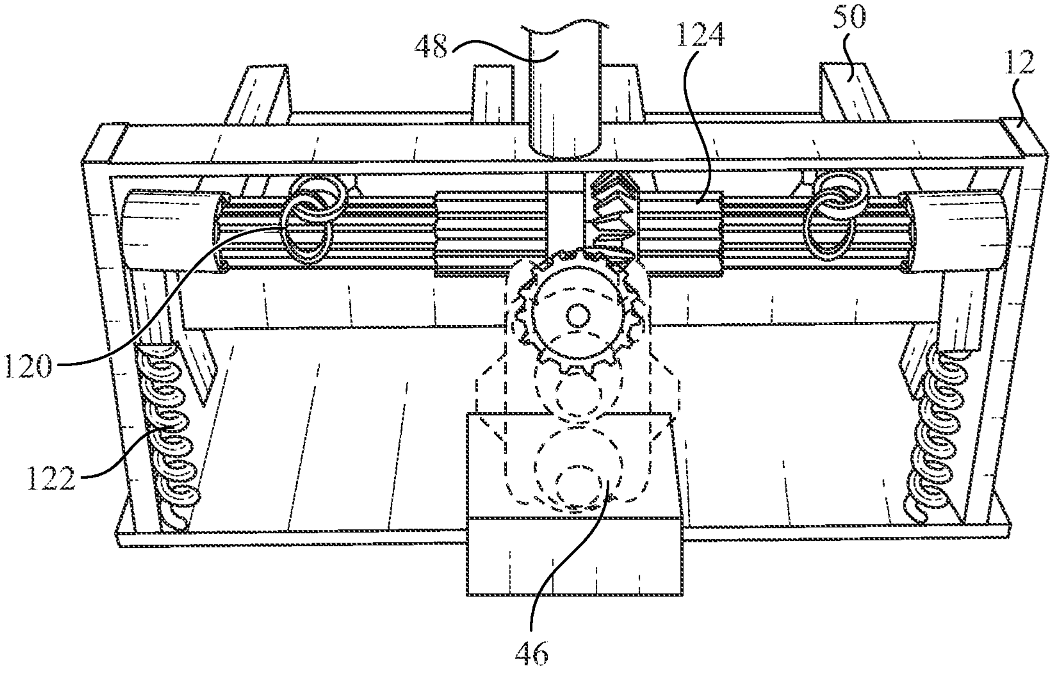
FIG. 10 illustrates a view of a portion compression device according to some variations described herein.

Referring to FIG. 1, a compression device 10 may include a stepper assembly 12, a housing assembly 14, and a fulcrum assembly 16. The stepper assembly 12 may include a first compressor drive lever hydraulic motor 46, a handlebar 48, at least one stepper pedal 50, and a hydraulic assembly as best seen in FIG. 10. The housing assembly 14 may include a second compressor drive lever hydraulic motor 44 in operable communication with the first compressor drive lever hydraulic motor 46 via at least one hydraulic hose. The housing assembly 14 may include a first height adjustment foot 40 in operable communication with the housing assembly 14, the at least one height adjustment foot 40 being constructed and arranged to provide for adjustment of the height of the compression device. The height adjustment foot 40 may optionally include a hydraulic drive motor height offset mechanism as best seen in FIG. 9, constructed and arranged to adjust plunge depth of a compressor plunger. A second height adjustment foot 42 may be in operable communication with the housing assembly 14 and may also be constructed and arranged to assist in adjusting the height of the compression device. The housing assembly 14 may include a housing 36 constructed and arranged to house a compressor recoil generator as best seen in FIG. 5, a width slider assembly as best seen in FIG. 6, and a plunger stability collar as best seen in FIG. 7. The housing may define at least one through hole or slot 38 constructed and arranged to slidably engaged with the fulcrum assembly 16 such that the fulcrum assembly 16 and compression plunger may be properly positioned above a patient. The fulcrum assembly 16 may include a fulcrum frame 26, a compression drive lever 18, and a compression counter 52. The fulcrum assembly 16 may be in operable communication with a compressor plunger comprising a plunger head 34, a plunger neck 28, a tapered neck portion 32, and a safety stop collar 30. The compressor plunger may be hingedly attached to an end joint 20 opposite a distal end 22 of the compression drive lever 18. The compression drive lever 18 may define a variable compression force recess 24 near the distal end 22 which may vary in depth such that compression force applied by the compression plunger head to a patient is variable and adjustable by sliding the fulcrum assembly 16 within the slot 38.

Figure 2:
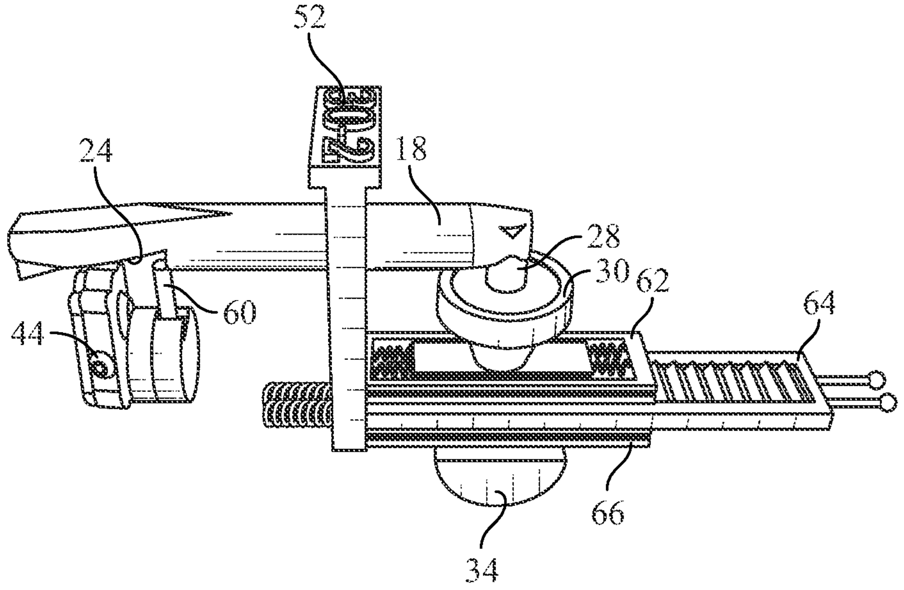
FIG. 2 illustrates a view of a portion compression device according to some variations described herein.
Figure 3:
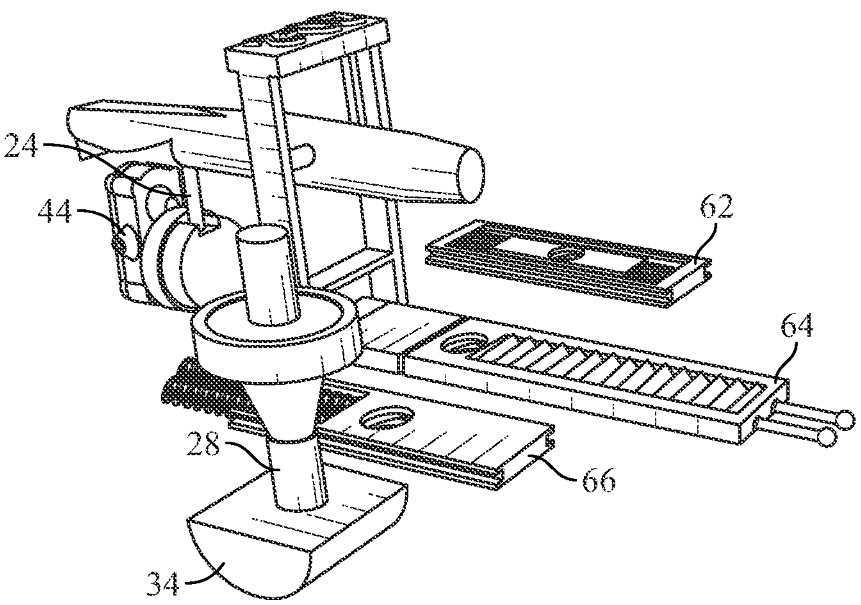
FIG. 3 illustrates an exploded view of a portion compression device according to some variations described herein.

Referring to FIGS. 2 and 3, a fulcrum assembly 16 may include a fulcrum frame 26, a compression drive lever 18, and a compression counter 52. The fulcrum assembly 16 may be in operable communication with the second compressor drive lever hydraulic motor 44 such that a piston 60 in operable communication with the second compressor drive lever hydraulic motor 44 may engage the variable compression force recess 24 to drive the compression drive lever 18, and in turn, provide compressive force to a patient's chest via the plunger head 34. The second compressor drive lever hydraulic motor 44 may include a geneva mechanism to provide for intermittent Rotary motion of a portion of the second compressor drive lever hydraulic motor 44 such that the Pistons 60 may intermittently engage the variable compression force recess 24 such that compressive force may be applied to a patient's chest intermittently. The fulcrum assembly 16 may be in operable communication with the compressor plunger comprising a plunger head 34, a plunger neck 28, a tapered neck portion 32, and a safety stop collar 30. The plunger neck 28 may be disposed within a portion of and passed through a portion of each of the compressor recoil generator 62, the width slider assembly 64, and the plunger stability collar 66. As best seen in FIG.

3, each of the compressor recoil generator 62, the width slider 64, and the plunger stability collar 66, may define a respective through hole through which the compressor neck 28 may pass. The second compressor drive lever hydraulic motor 44 may drive the piston 60 into the variable compression force recess 24 which may in turn drive the compression plunger down via the lever action of the compression drive lever 18.

Figure 4:
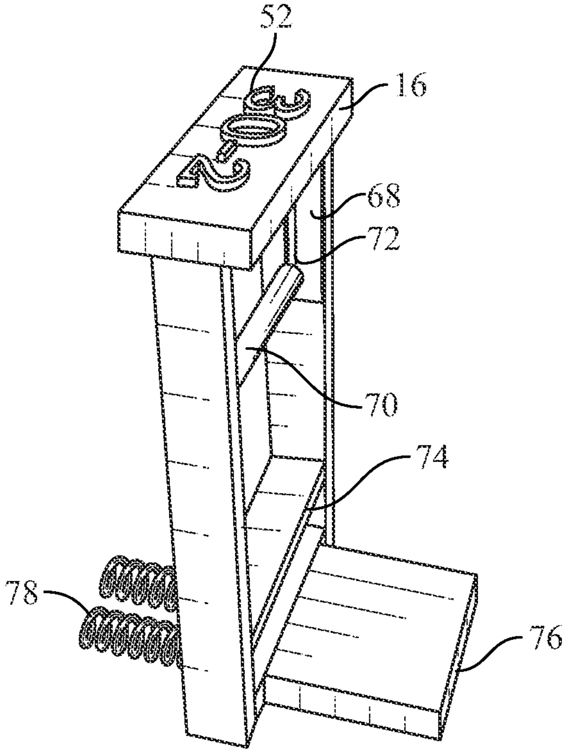
FIG. 4 illustrates a view of a portion compression device according to some variations described herein.

Referring to FIG. 4, the fulcrum assembly 16 may include a fulcrum 70, at least one structural support 74, and activator rod 68, a fulcrum elastic member 72, a compression counter 52, positioning elastic members 78, and a patient contact face 76. The compression drive lever 18 may be mated to the fulcrum 70 to form a lever. The compression counter 52 may include a counting mechanism in operable communication with the activator rod 68 wherein the activator rod 68 is constructed and arranged to elastically collapse. Upon elastic collapse, the activator rod 68 may activate the compression counter 52 to provide an audible noise such as a "click" to indicate a successful compression of the compression device. The compression counter 52 may provide a visual indication of successful compressions, such as, but not limited to, providing a visual indication of the number of compressions successfully administered and a visual indication of the number of times that 30 repetitions of compressions have been completed.

Referring to FIG. 5, a compressor recoil generator 62 make include a recoil generator frame, recoil tension elastic members 84, and a compressor collar which may include a first compressor collar portion 80 and a second compressor collar portion 82. A plurality of bearings 86 may be disposed within the compressor collar. The first compressor collar portion 80 and the second compressor collar portion 82 may define a through hole through which a portion of the compressor plunger may pass during operation.

Referring to FIG. 6, the width slider assembly 64 may include a positioning collar 94, quick attach positioning bars 92, and a friction positioning plate 90. The width slider assembly 64 may define a through hole that may include the positioning collar 94 and through which a portion of the compressor plunger may pass during operation. The width slider assembly may be an operable communication with a width slide lock screw 130 constructed and arranged to thread through the housing assembly to apply pressure on the friction positioning plate 90 of the width slider assembly 64 such that the width of the compression device may be secured.

Referring to FIG. 7, the plunger stability collar 66 may include positioning elastic members 98 and a second plurality of collar bearings 96 constructed and arranged to facilitate the smooth motion of the compressor plunger through a through hole in the plunger stability collar 66.

Figure 8:
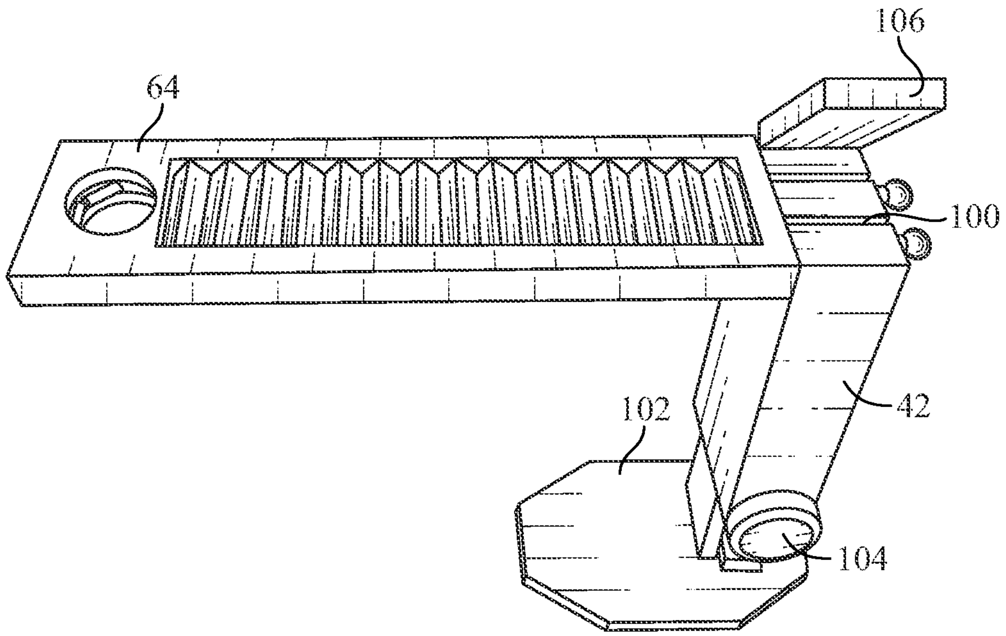
FIG. 8 illustrates a view of a portion compression device according to some variations described herein.

Referring to FIG. 8, the width slider assembly 64 may be removably connected to the second height adjustment foot 42 by securing the quick attach positioning bars 92 within a plurality of positioning slots 100 defined by the body of the second height adjustment foot 42. The second height adjustment foot 42 may include a body lock latch 106 to further facilitate the connection of the width slider assembly 64 to the second height adjustment foot 42. The second height adjustment foot 42 may include a plate 102 and a height adjustment system 104 constructed and arranged to allow the plate 102 and the second height adjustment foot 42 to vertically separate i.e. increase in height, when more than a predetermined amount of pressure is applied by the compressor plunger on a patient. For example, but not limited to, the height adjustment system 104 may include a spring-loaded ratchet system which may prevent the assembly from moving downward unless a release button is held but may allow the assembly to automatically move upward when sufficient force is applied by the compressor plunger to a patient's body, for example, about 62 pounds.

Referring to FIG. 9 the first height adjustment foot 40 may include a hydraulic drive motor offset mechanism 110 integrated therein, the offset mechanism 110 being constructed and arranged to utilize three fulcrum's and two connection points, the first connection point on the second compressor drive lever hydraulic motor 44 and the second connection point on the second plate 112 of the first height adjustment foot 40. The offset mechanism 110 may engage as the frame is raised away from the height adjustment foot 40 and may proportionately push the gear assembly and piston closer to decompressor lever resulting in a deeper compression of the compressor plunger. The first height adjustment foot 40 may additionally include a safety hinge 114 hingedly attaching the second plate 112 and to the first height adjustment foot 40 wherein the safety hinge 114 is constructed and arranged to hingedly separate the first adjustment foot 40 from the second plate 112 when more than a predetermined amount of pressure is applied by the compressor plunger on a patient such that the compression device is separated from the patient to reduce over application of force to a patient.

Referring to FIG. 10, the stepper assembly 12 may include a first compressor drive lever hydraulic motor 46, a handlebar 48, at least one stepper pedal 50, a gear assembly 124 in operable communication with drive belts 120. Upon depression of the at least one stepper pedal 50, the drive belt 120 may drive to gear assembly 124 such that the first compressor drive lever hydraulic motor 46 may be powered by the depression of the at least one stepper pedal 50. The gear assembly 124 may include a hydraulic motor driving gear constructed and arranged to drive the first compressor drive lever hydraulic motor 46 in order to convert kinetic energy into hydraulic pressure. The stepper assembly 12 may include return elastic members 122 constructed and arranged to return the at least one stepper pedal 52 to an upper position after a user has depressed the at least one stepper pedal 50. The handlebar 48 may be telescoping such that the user may adjust the height of the handlebar 48.

Figure 11:
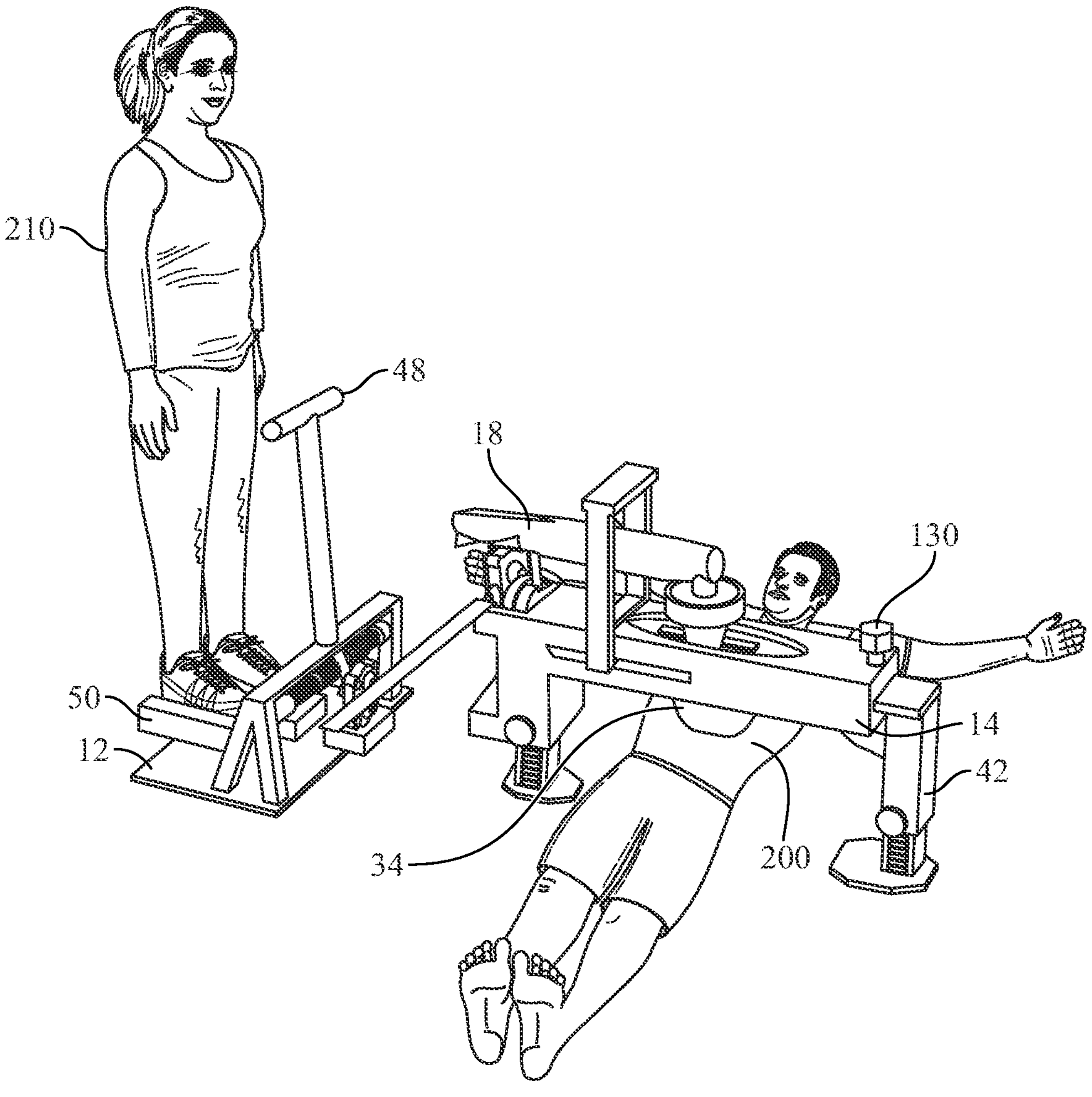
FIG. 11 illustrates a view of a compression device in use according to some variations described herein.

Referring to FIG. 11, a patient 200 may receive CPR via the compression device by positioning the compression device over the patient 200. The height and width of the compression device may be adjusted via the first and second height adjustment feet, the width slider assembly in conjunction with the width slide lock screw 130, the plunger stability collar, and decompressor recoil generator such that the housing assembly 14 and the plunger head 34 may be positioned over the patient 200. A user 210 may optionally grip the handlebar 48 of these stepper assembly 12 and placed their feet on the at least one stepper pedal 50 in order to operate the compression drive lever 18 and apply compressive force to the chest of the patient 200.

In practice and in use, a patient individual in need of CPR may be lying in a chest up prone position. The housing assembly may be positioned above the individual in need of CPR, and the stepper assembly adjacent thereto. A user may adjust the position of the compressor plunger above the chest of the patient via the width slider assembly and the at least one height adjustment foot. Compression plunger height may be adjusted by positioning the piston appropriately within the variable compression force recess. A user may step on the at least one stepper pedal in order to drive the compressor drive lever hydraulic motor, which in turn may drive the second motor attached to the piston which apply force on the variable compression force recess of the compression drive lever which in turn may apply force on the compression plunger via the connection of the compression plunger and the connection and joint, thereby providing compressive force on the chest of a patient.

The following description of variants is only illustrative of components, elements, acts, products, and methods considered to be within the scope of the invention and are not in any way intended to limit such scope by what is specifically disclosed or not expressly set forth. The components, elements, acts, products, and methods as described herein may be combined and rearranged other than as expressly described herein and are still considered to be within the scope of the invention.

According to variation 1, a compression device may include a compression plunger including a plunger head, a plunger neck, a tapered neck portion, and a safety stop collar. The compression device may include a stepper assembly including a first compressor drive lever hydraulic motor, a handlebar, at least one stepper pedal, a gear assembly in operable communication with the first compressor drive lever hydraulic motor and the at least one stepper pedal. The compression device may include a housing assembly including a second compressor drive lever hydraulic motor in operable communication with the first compressor drive lever hydraulic motor via at least one hydraulic hose; a first height adjustment foot in operable communication with the housing assembly and including a hydraulic drive motor height offset mechanism; a second height adjustment foot in operable communication with the housing assembly; a compressor recoil generator; a width slider assembly; a plunger stability collar; a housing constructed and arranged to house the compressor recoil generator, the width slider assembly, and the plunger stability collar, the housing defining at least one slot constructed and arranged to slidably engage with a fulcrum assembly. The compression device may include a fulcrum assembly including a fulcrum frame, a compression drive lever hingedly attached to the compression plunger, and a compression counter, wherein the compressor plunger is hingedly attached to an end joint of the compression drive lever opposite a distal end of the compression drive lever and the compression drive lever defines a variable compression force recess near the distal end that varies in depth such that compression force applied by the compression plunger head to a patient is variable and adjustable by sliding the fulcrum assembly within the at least one slot.

Many different embodiments have been disclosed herein, in connection with the above description and the drawing. It will be understood that it would be unduly repetitious and obfuscating to describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

An equivalent substitution of two or more elements can be made for anyone of the elements in the claims below or that a single element can be substituted for two or more elements in a claim. Although elements can be described above as acting in certain combinations, and even initially claimed as such, it is to be expressly understood that one or more elements from a claimed combination can, in some cases, be excised from the combination and that the claimed combination can be directed to a subcombination or variation of a subcombination.

It will be appreciated by persons skilled in the art that the present embodiment is not limited to what has been particularly shown and described hereinabove. A variety of modifications and variations are possible considering the above teachings without departing from the following claims.

What is claimed is:

1. A compression device, comprising:
- a compression plunger;
- a stepper assembly;
- a housing assembly comprising:
  - a second compressor drive lever hydraulic motor in operable communication with a first compressor drive lever hydraulic motor via at least one hydraulic hose;
  - a first height adjustment foot in operable communication with the housing assembly;
  - a second height adjustment foot in operable communication with the housing assembly;
  - a housing defining at least one slot constructed and arranged to slidably engage with a fulcrum assembly, the fulcrum assembly comprising a fulcrum frame, a compression drive lever hingedly attached to the compression plunger, and a compression counter, wherein the compressor plunger is hingedly attached to an end joint of the compression drive lever opposite a distal end of the compression drive lever and the compression drive lever defines a variable compression force recess near the distal end that varies in depth such that compression force applied by the compression plunger head to a patient is variable and adjustable by sliding the fulcrum assembly within the at least one slot.

2. The compression device of claim 1, further comprising a plunger head, a plunger neck, a tapered neck portion, and a safety stop collar.

3. The compression device of claim 1, further comprising a plunger head, a plunger neck, a tapered neck portion, and a safety stop collar.

4. The compression device of claim 1, wherein the housing assembly includes a hydraulic drive motor height offset mechanism.

5. The compression device of claim 1, further comprising a housing.

6. The compression device of claim 5, further comprising a compressor recoil generator.

7. The compression device of claim 6, wherein the compression recoil generator is housed within the housing.

8. The compression device of claim 5, further comprising a width slider assembly.

9. The compression device of claim 8, wherein the width slider assembly is housed within the housing.

10. The compression device of claim 5, further comprising a plunger stability collar.

11. The compression device of claim 10, wherein the plunger stability collar is housed within the housing.

12. A compression device, comprising:
- a compression plunger comprising a plunger head, a plunger neck, a tapered neck portion, and a safety stop collar;
- a stepper assembly comprising a first compressor drive lever hydraulic motor, a handlebar, at least one stepper pedal, a gear assembly in operable communication with the first compressor drive lever hydraulic motor and the at least one stepper pedal;

a housing assembly comprising:

a second compressor drive lever hydraulic motor in operable communication with the first compressor drive lever hydraulic motor via at least one hydraulic hose;

a first height adjustment foot in operable communication with the housing assembly and comprising a hydraulic drive motor height offset mechanism;

a second height adjustment foot in operable communication with the housing assembly;

a compressor recoil generator;

a width slider assembly;

a plunger stability collar;

a housing constructed and arranged to house the compressor recoil generator, the width slider assembly, and the plunger stability collar, the housing defining at least one slot constructed and arranged to slidably engage with a fulcrum assembly; and a fulcrum assembly comprising a fulcrum frame, a compression drive lever hingedly attached to the compression plunger, and a compression counter, wherein the compressor plunger is hingedly attached to an end joint of the compression drive lever opposite a distal end of the compression drive lever and the compression drive lever defines a variable compression force recess near the distal end that varies in depth such that compression force applied by the compression plunger head to a patient is variable and adjustable by sliding the fulcrum assembly within the at least one slot.

13. The compression device of claim 12, wherein the housing assembly is positionable above an individual in need of CPR.

14. The compression device of claim 13, wherein the stepper assembly is positioned adjacent to the housing assembly.

15. The compression device of claim 14, wherein the height of the compression plunger is adjustable via a piston.

16. The compression device of claim 15, wherein the compression plunger applies a compressive force on the chest of the individual in need of CPR.

17. The compression device of claim 16, wherein the stepper pedal drives the first compressor drive lever hydraulic motor.

18. The compression device of claim 17, wherein the first compressor drive lever hydraulic motor drives the second compressor drive lever hydraulic motor.

19. The compression device of claim 18, wherein the second compressor drive lever hydraulic motor is attached to the piston to apply force on the variable compression force recess.

* * * * *